United States Patent [19]

Green

[11] 4,293,421
[45] Oct. 6, 1981

[54] METHOD AND EQUIPMENT FOR A WRAP-AROUND UPFLOW SUBMERGED ANAEROBIC FILTER FOR SEWAGE

[76] Inventor: Alvin W. Green, 7310 85th St. N.W., Gig Harbor, Wash. 98335

[21] Appl. No.: 145,243

[22] Filed: Apr. 30, 1980

[51] Int. Cl.³ ............................................. C02F 3/28
[52] U.S. Cl. .................................. 210/603; 210/606; 210/618; 210/631; 210/747; 210/170; 210/532.2
[58] Field of Search ....................................... 210/2–9, 210/14, 15, 16, 17, 80, 170, 252, 256, 532.2, 601, 603, 605, 606, 612, 614, 616–618, 630, 631, 792, 793, 747

[56] References Cited

U.S. PATENT DOCUMENTS

| | | | |
|---|---|---|---|
| 624,985 | 5/1899 | Scott-Monerieff | 210/16 |
| 947,333 | 1/1910 | Hamilton | 210/16 |
| 1,002,089 | 8/1911 | Sofleiss | 210/198 R |
| 3,057,796 | 10/1962 | Davis | 210/15 |
| 3,202,285 | 8/1965 | Williams | 210/14 |
| 3,784,012 | 1/1974 | Carlson | 210/170 |
| 3,950,252 | 4/1976 | Jordan et al. | 210/170 |
| 4,039,451 | 8/1977 | Smith | 210/170 |
| 4,162,976 | 7/1979 | Monson | 210/170 |
| 4,211,655 | 7/1980 | Jordan | 210/170 |

Primary Examiner—Peter A. Hruskoci

[57] ABSTRACT

A method and equipment for secondary sewage treatment by anaerobic treatment of sewage after the sewage has passed from a septic tank or other primary treatment device. The effluent from the primary treatment device is directed to the lower annular volume of the wrap-around anaerobic filter. The outer side wall boundaries of the wrap-around filter are defined by a permeable or impermeable earth retention cloth while the inner boundary is defined by the primary treatment device. The anaerobic filter is composed of gravel or other surface contact media. After the effluent reaches the lower annular volume, the effluent is directed through the void spaces of the anaerobic wrap-around upflow filter. Having passed through the filter the effluent is delivered to the drain field or other final treatment facility.

10 Claims, 5 Drawing Figures

METHOD AND EQUIPMENT FOR A WRAP-AROUND UPFLOW SUBMERGED ANAEROBIC FILTER FOR SEWAGE

BACKGROUND OF THE INVENTION

Standards for the disposal of sewage have continually risen. Conversely, population pressure has continually called for the increased use of land. Thus, land which is marginal in regard to the treatment of sewage is receiving increased pressure for the ability to be put to its best use.

Septic tanks in various embodiments have been used for some 130 years to treat sewage when sewer systems are not available. This anaerobic process decomposes organic material utilizing enzymes and microbes which thrive in an environment devoid of oxygen. Untreated human waste and/or sewage from a building comprising both liquids and water carried solids, are discharged into septic tanks for partially effective decomposition and clarification by biological, physical and other natural processes. After the partial decomposition, the effluent is often discharged directed to the entry of a subsurface drain field for percolation into the subsoil under aerobic conditions. The discharge of effluent to a subsurface drain field at this point brings into focus the ability of the land to handle the burden.

To lessen the burden on the land and thereby increase the likelihood of approval for the use of the land, septic tank effluent has been treated secondarily before the discharge of the effluent to the subsoil.

In 1962, Lloyd Davis, in his U.S. Pat. No. 3,057,796 set forth a septic tank with a surrounding gravel bed. From the gravel bed, however, the effluent passes directly to the surrounding subsoil. In the present invention, an upflow filter is used which effectively collects the effluent so that the effluent can be passed to the final treatment phase.

In 1965, Frederick P. Willians in his U.S. Pat. No. 3,202,285 illustrated and described the further treatment of septic tank effluent in an adjacent aerobic tank. In 1974, Henry B. Carlson, in his U.S. Pat. No. 3,784,012, disclosed the construction of a septic tank positioned within the top of a structure forming a leaching pool wherein the septic tank effluent was further treated before reaching the surrounding subsoil.

In 1975 or earlier, John Hamilton of Seattle, Wash., first treated wastes discharged from an institution or family dwelling in a two compartment concrete septic tank. After passing through the two compartments the effluent is treated downstream in two concrete anaerobic upflow filters.

In 1976, Edward J. Jordan and John R. Snyder, in their U.S. Pat. No. 3,950,252, illustrated and described their overall upflow filter to be used with a home sewage treatment plant. They provided a concrete container having first and second upflow filtering chambers inclusive of gratings having filtering media.

In all of the above patents a separate system is necessarily constructed. This naturally expands the expense of the system, and subjects the system to added potential for breakdown.

It is believed that a continuing review of patents and literature will not reveal a method, configuration or equipment for the treatment of sewage whereby anaerobic digestion and filtering processes are undertaken as disclosed in the present invention. The advantages of the present invention are discussed in the Summary of the Invention.

SUMMARY OF THE INVENTION

To increase the effectiveness of the treatment of sewage discharged from a dwelling or institution a method and equipment for the secondary treatment of sewage is disclosed. A septic tank is centrally located in the midst of a cavity dug in the subsoil. The subsoil is lined with either a permeable or impermeable membrane. Between the septic tank and the membrane is placed filter medium. After the effluent has passed through the septic tank, the effluent is directed to the lowest elevation of the filter medium. The continuing introduction of effluent causes the effluent to upflow through the filter medium whereupon the effluent is collected and directed to the final treatment phase.

In the disclosed upflow wrap-around filter the overall removal of organic and inorganic suspended and dissolved solids is in the range of 75% or more versus the approximate 40% removal or less from a conventional septic tank. The wrap-around upflow subsurface anaerobic filter package further is compatible with existing septic tanks and common subsurface final treatment technology such as sand filters, rotating discs and drainfields.

In utilizing the equipment shown in the various figures of these drawings and following the method indicated in these drawings centering on a central septic tank and wrap-around filter the following advantages are realized:

1. The biological heat of the septic tank is transferred to the filter and conversely the biological heat of the filter transfers to the septic tank thereby enhancing the effectiveness of both;
2. The upflow filter is constructed from the same cavity as the septic tank is placed. Thus, construction costs are minimized;
3. The wrap-around upflow filter may be installed to improve a depreciating or failed septic tank drainfield system which is already in place;
4. The upflow anaerobic filter intercepts usual septic tank discharge of solids caused by boiling or shock loads;
5. Drainfield life is prolonged;
6. Drainfields may be used in more marginal soils;
7. Drainfield surface areas and linear fast absorptive interface requirements are reduced via the utilization of the annular interface area with the subsoil when a permeable membrane is utilized;
8. The wrap-around upflow anaerobic filter may be pumped at the same time the central septic tank is pumped via risers which are also sampling parts;
9. Restorative measures are easily carried out by using risers and perforated piping to direct selected enzymes or other reagents through the filter for the upflow removal of slime growths on the filter media of the upflow filter, followed by using perforated piping and risers to direct water throughout the gravel of the upflow anaerobic wrap-around filter; and
10. Favorable cost items such as plastic pipes, gravel, plastic sheets, rings, and glass cloth are used as upflow filter materials.

DETAILED DESCRIPTION OF THE DRAWINGS

Figure 1:
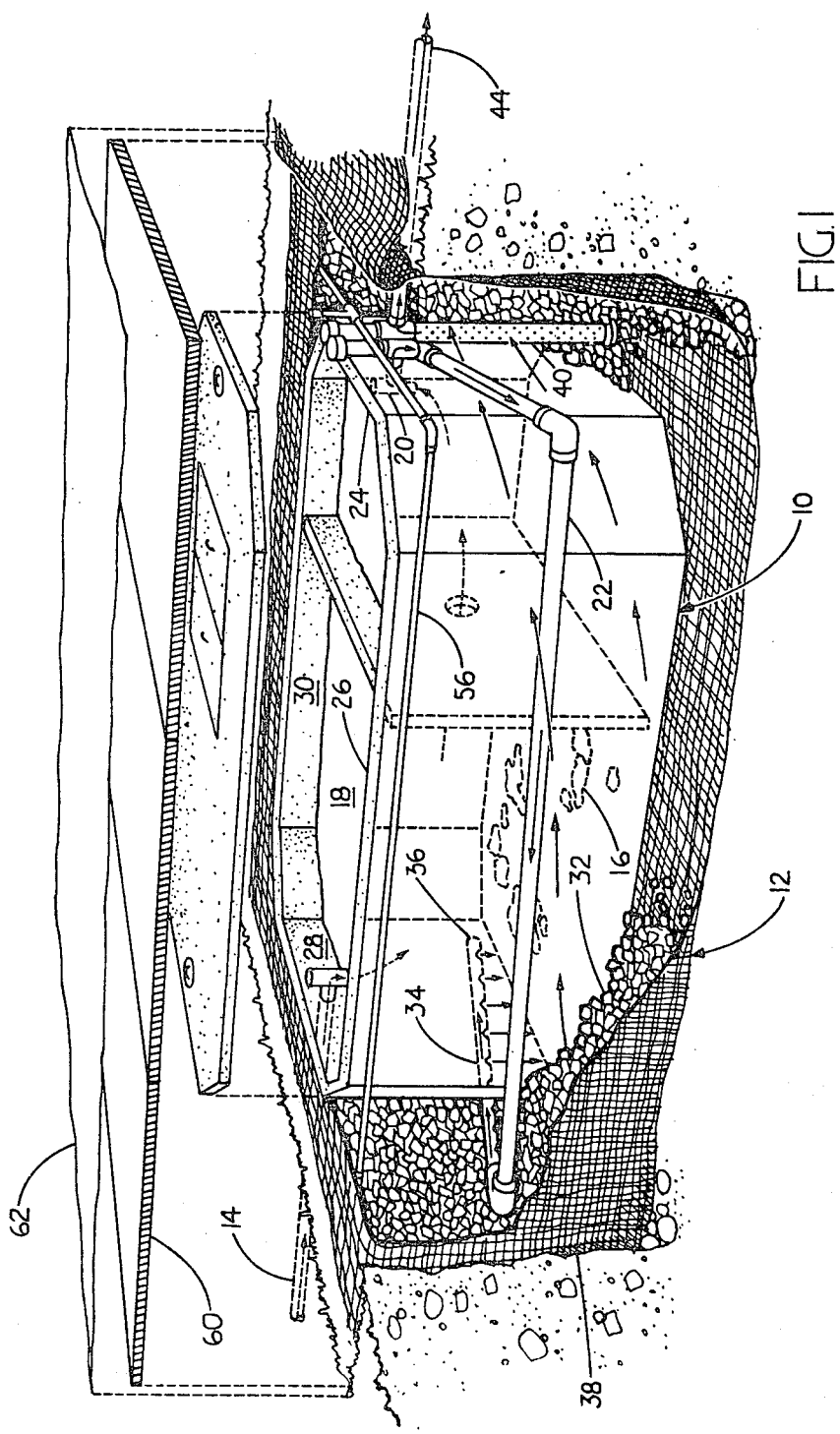
FIG. 1 is a partial cut-away perspective view of the septic tank and the laterally surrounding wrap-around anaerobic filter.

In FIG. 1, a septic tank 10 is illustrated in perspective view. It is to be noted that the upflow submerged anaerobic filter 12 is equally effective when used with other primary treatment devices. As set forth in FIG. 1, the septic tank is positioned below ground level.

Inlet line 14 delivers raw sewage to the septic tank 10. The inlet line 14 is typically positioned towards the top of the septic tank. In the first step of decomposition which occurs in the septic tank, the septic tank process causes the settled solids and dissolved organic solids to form on the bottom of the septic tank forming the sludge bed 16. The floatable solids remain at the surface of the liquid level within the septic tank. The floatable solids which are positioned at the liquid level are designated the scum blanket 18.

In the majority of septic tanks positioned near the top of the septic tank and opposite the inlet line is an outlet orifice 20. The outlet orifice 20 permits the discharge of the liquid and formed scum blanket 18 from the septic tank 10.

In the preferred embodiment, connected to the outlet orifice 20 is the effluent discharge line 22 which exits wall 24 and circumferences the two walls 26 and 28 of the septic tank. The effluent discharge line 22 could equally effectively circumference the walls 28 and 30 of the septic tank or circumference either wall 26 or wall 30. The effluent discharge line 22 travels from approximately the top elevation of the septic tank 10 to approximately the lowest elevation of the upflow wrap-around anaerobic filter 12. Thus, the distance of circumference about the walls of the septic tank is not crucial but the directing of the effluent to the lower elevation of the upflow wrap-around anaerobic filter 12 is. Without directing the effluent to the lower elevation, the effluent will not obtain the "upflow" advantage of passing through filter medium 32. Although the flow in the preferred embodiment through the effluent discharge line 22 is caused by gravity, the flow can also be directed by pumping or other devices.

The last section of the effluent discharge line 22 is a distribution line 34. In the preferred embodiment, the distribution line 34 includes notches which thereby deposit the effluent within the filter medium 32. The effluent that does not pass through the notches passes out the distribution line outlet orifice 36.

The annular filter medium 32 circumferences the walls 24-30 of the septic tank 10. By positioning the filter medium 32 about the circumference of the septic tank 10 the contractor can construct the upflow wrap-around anaerobic filter 12 by merely enlarging, if necessary, the dimensions of the cavity dug for the placement of the septic tank 10. Further, the biological heat generated within the septic tank 10 is radiated to the adjacent filter medium 32. Similarly, the biological heat generated by the filter media transfers to the septic tank 10. The raising of the temperature of the filter medium 32 and septic tank dramatically increases the effectiveness of both.

The filter medium 32 illustrated in FIG. 1 is gravel and rocks. The filter medium 32 can also be made up of plastic rings, sheets, ribbons and other medium.

The filter medium 32 necessarily includes a series of void spaces. The effluent travels through the void spaces providing a detention period and contact with filamentous zoogloea growths. The detention and contact causes the effluent to eutrophy. The resultant reduced, dissolved and suspended solids minimize subsoil clogging and maximize drainfield life. Cloggable entities shorten the life of the final treatment phase of the sewage disposal system.

Positioned about the side walls of the cavity is membrane 38. The membrane may be either pervious or impervious depending on the soil conditions. A retaining wall could be substituted for the membrane although at greater expense.

If the soil conditions are not excessively wet, the membrane 38 is made of pervious material such as glass cloth or plastic cloth. The pervious membrane 38 restricts the invasion of the fine aggregates found in the dirt surrounding the upflow wrap-around anaerobic filter 12. Conversely, the pervious membrane allows for the liquid within the filtrate to pass through the surrounding absorptive wall interface of the membrane 38. Further, the previous membrane 38 allows for additional dissipation by leaching into the surrounding soil.

If the soil conditions are wet or the ground water table is high, however, the membrane 38 can be made impervious or a wall may be constructed. An example of an impervious membrane capable of excluding surrounding water is polyethylene sheeting. In wet soils, the impervious membrane can protect the filter 12 and allow it to work effectively. In this situation, after the effluent has passed through the filter, the effluent can be pumped to other soils capable of handling the effluent.

Figure 2:
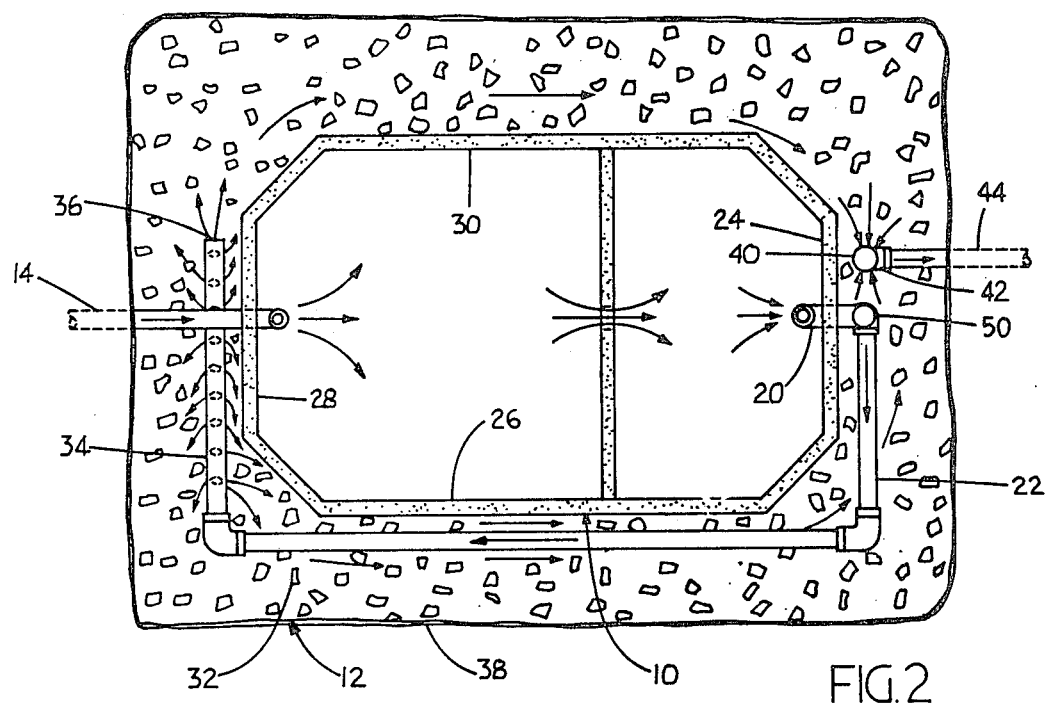
FIG. 2 is an overhead view of the septic tank and laterally surrounding wrap-around anaerobic filter. Also, directional arrows show the progress of effluent through the septic tank, effluent discharge line, and the wrap-around anaerobic filter.
Figure 3:
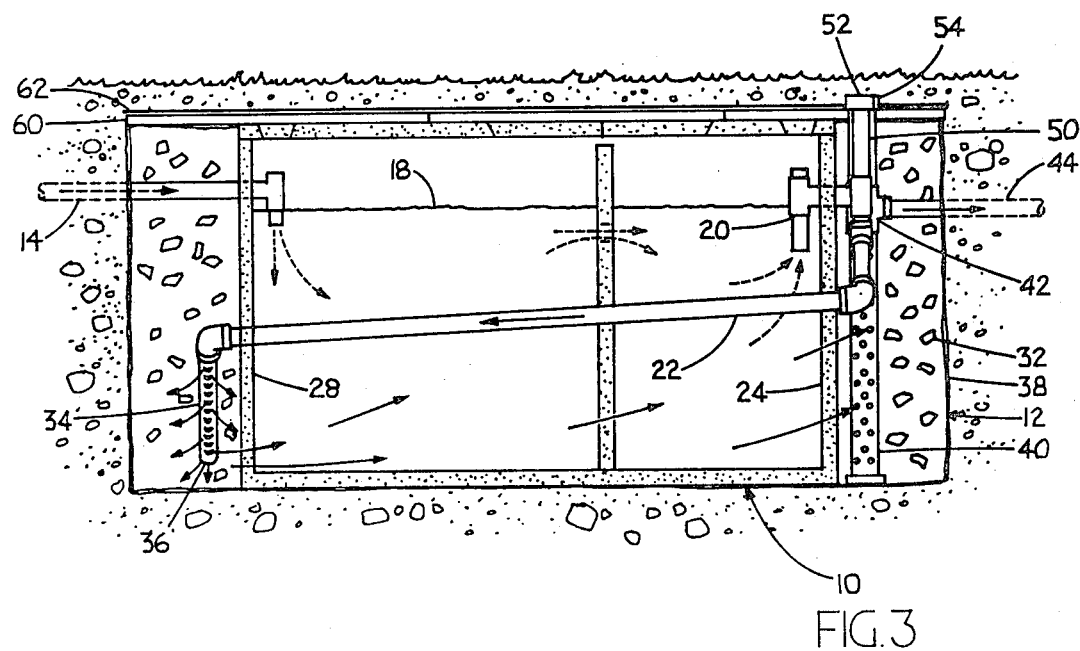
FIG. 3 is a side view of the wrap-around anaerobic filter. Directional arrows show the progress of effluent from the low elevation when discharged from the distribution line until entry into the filter discharge riser.

As set forth in FIGS. 2 and 3, after the effluent is directed to the lower elevation of the filter, the effluent begins to circulate back towards the septic tank outlet orifice 20 oppositely positioned through wall 24. Not only does the effluent circulate horizontally through the wrap-around filter 12 but the effluent also rises in elevation. The combination of circulating the effluent and also causing it to rise in elevation as it works back towards the opposite side of the septic tank 10 causes the effluent to pass through the maximum of void spaces of the filtration medium 32. The movement of the effluent is caused by the continual discharge of more effluent through the effluent discharge line 22.

Figure 4:
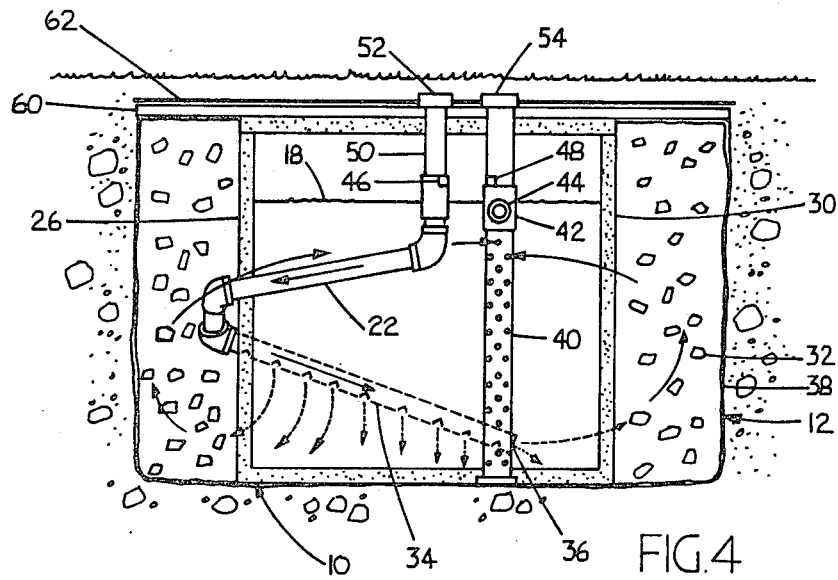
FIG. 4 is a front view of the effluent discharge line and the filter discharge riser.

As set forth in FIG. 4, positioned diametrically opposite of the discharge line outlet orifice 36 is the discharge riser 40. The discharge riser 40 in the preferred embodiment is a vertical cylinder which is perforated thereby allowing the movement of effluent into the riser. As set forth previously, the filter discharge riser 40 is positioned diametrically opposite the discharge line outlet orifice 36 to maximize detention time. Thus, the effluent liquid that enters the discharge riser 40 has travelled through the entire annular length of the upflow wrap-around anaerobic filter 12. Positioned toward the top of the filter discharge riser 40 is sanitary Tee 42. The sanitary Tee 42 directs the flow of effluent from the discharge riser 40 through the final treatment line 44 to the final treatment phase of the sewage treatment procedure. Examples of the final treatment phases are drainfields, dry wells, sand filters, and surface of surface waters. In the preferred embodiment, the system has a safety feature that causes it to be bypassed and thus allows the septic tank to work despite the fact that the filter 12 may become blocked. Overflow weirs 46 and 48 are precisely positioned on the effluent discharge line 22 and the filter discharge riser 40 respectively. In the effluent discharge line, approximately adjacent to the filter discharge riser 40, a special sampling riser 50 rises vertically from the effluent discharge line 22. The sampling riser 50 includes overflow weir 46. If the filter 12 becomes clogged, effluent will back up in the effluent discharge line 22 and flow out the overflow weir 46. When this happens, the effluent passes directly or indirectly into the filter discharge riser 40 and overflow weir 48. Thus, the effluent will pass through to the final treatment phase. The special sampling riser 50 also includes testing cap 52. Thus, the user can test the effectiveness of the effluent discharge line by removing the testing cap 52 and take direct tests from the effluent discharge line 22.

As set forth previously, the filter discharge riser 40, rises above the sanitary Tee 42 and the overflow weir 48 is positioned at an elevation slightly higher than the sanitary Tee. Thus, should the filter discharge riser 40 become clogged, effluent will pass through the overflow weir 48 and thus out the sanitary Tee to the final treatment line 44. At the top of the filter discharge riser 40 is filter discharge riser testing cap 54. The filter discharge testing cap serves two purposes: (1) it allows for testing directly into the filter discharge riser; and further allows for the placement of a plumbing line to be positioned down through the filter discharge riser. The overflow weirs 46 and 48 also serve the purpose of continuous venting of gaseous products to the building plumbing vent system.

Figure 5:
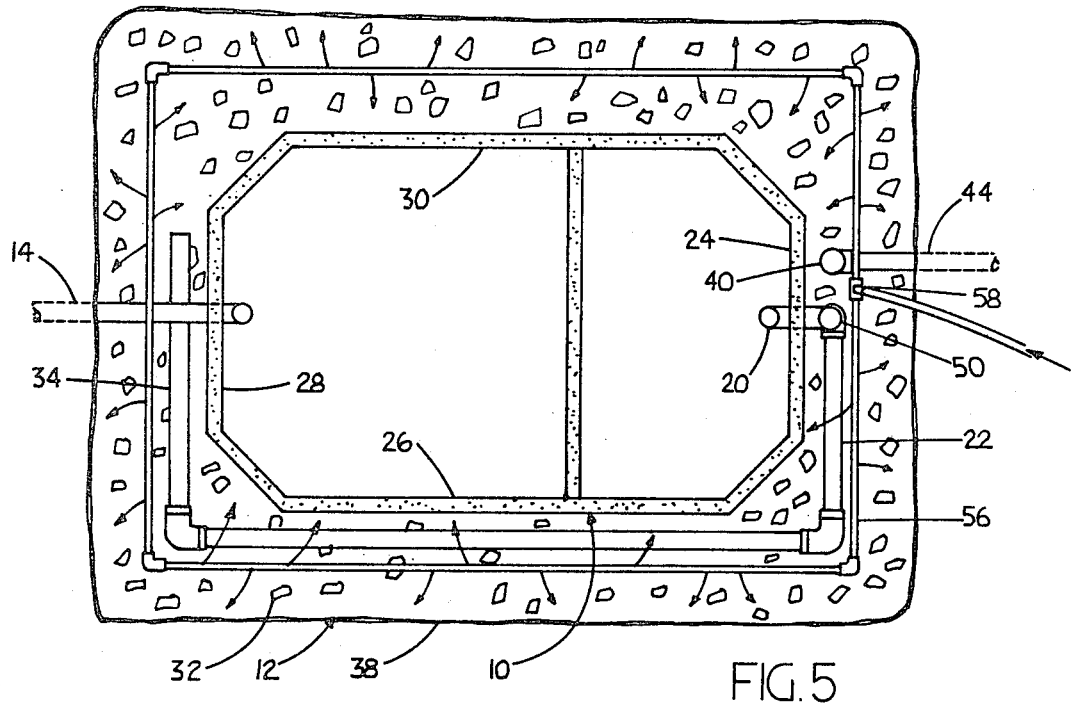
FIG. 5 is an overhead view of the perforated wash down manifold as it circumferences the wrap-around anaerobic filter.

As set forth in FIG. 5, a perforated wash-down manifold lies approximately at the elevation of the top of the septic tank 10 and circumferences the septic tank 10 over the upflow wrap-around anaerobic filter 12. The perforated wash-down manifold 56 in conjunction with the connnection Tee 58 allows for the connection of an ordinary garden hose to inject water into, down and over the filter system thereby washing down the filter. Further, this can be accomplished at the time the septic tank is pumped. The perforated wash-down manifold 56 also can be used to inject enzymes and selected microbial life.

If the user wishes to pump the system he merely connects a hose to the connection Tee 58 of the perforated wash-down manifold 56 and injects water into the filter. At the same time, a suction line is placed down the filter discharge riser 40. Thus, the accumulated cloggables and effluent which are decreasing the effectiveness of the filter are sucked out the filter discharge riser with the aid of the influx of wash-down water flowing through the perforated wash-down manifold 56.

As set forth in FIG. 1, the filter medium can be covered with filter medium overhead insulation 60. The filter medium overhead insulation serves to aid in the conservation of the biological heat generated by the filter system and the septic tank 10. The increased heat, as set forth previously, increases eutrification. This filter medium overhead insulation 60 can be made of insulation board such as asphaltic cornboard siding.

Further set forth in FIG. 1, overhead sheeting 62 may be used to cover the septic tank 10 and filter 12. The overhead sheeting is useful in wet conditions for it prevents downward percolation and precipitation.

Although a particular preferred embodiment of the invention has been disclosed above for illustrative purposes, it is to be understood that variations or modifications thereof which lie within the scope of the appended claims are contemplated.

I claim:

1. Equipment for the treatment of sewage comprising:

a septic tank having an inlet for raw sewage and an outlet for effluent, an anaerobic filter composed of a bed of surface contact material including void spaces for filamentous zoogloea growth laterally surrounding said septic tank, the inner boundary of said anaerobic filter being defined by said septic tank and the outer boundary being defined by a means for retaining the surrounding earth which prevents fine aggregates in the earth from entering said anaerobic filter, an effluent discharge line connecting said outlet to a perforated distribution line outlet for distributing said effluent into said anaerobic filter at approximately the lowest elevation in said anaerobic filter, a perforated discharge riser positioned diametrically opposite said distribution line outlet for collecting effluent which has passed through the filter, overlow weirs positioned on said effluent discharge line and said discharge riser for bypassing the filter and directing said effluent from said outlet to said discharge riser, said overflow weirs being connected to a vent system for venting the gaseous products produced in said anaerobic filter, and means for connecting said discharge riser to a final treatment system.

2. Equipment for treatment of sewage as claimed in claim 1, wherein said means for retaining comprises a permeable cloth membrane.

3. Equipment for the treatment of sewage as claimed in claim 1 wherein said perforated riser is positioned vertically from the lower to top elevation of the filter.

4. Equipment for treatment of sewage as claimed in claim 3 comprising, a perforated manifold positioned above the filter which is capable of delivering water or other liquids or enzymes to the top of the filter.

5. Equipment for treatment of sewage as claimed in claim 3 comprising, an insulation medium between the filter and the ground surface.

6. Equipment for treatment of sewage as claimed in claim 3 comprising, an impermeable sheeting covering the anaerobic filter.

7. Equipment for treatment of sewage as claimed in claim 1 wherein said means for retaining comprises an impermeable membrane.

8. A method for treatment of effluent discharged from a septic tank prior to delivery of the effluent to the final treatment phase comprising the steps of:

directing said effluent from said septic tank through an effluent discharge line into a perforated distribution line outlet at approximately the lowest elevation in an upflow anaerobic filter laterally surrounding said septic tank, said anaerobic filter composed of a bed of surface contact material including void spaces for filamentous zoogloea growth, the inner boundary of said anaerobic filter being defined by said septic tank, and the outer boundary being defined by a means for retaining the surrounding earth which prevents fine aggregates in the earth from entering the filter, passing said effluent upwardly and horizontally through said void spaces to contact said filamentous zoogloea growth, collecting said effluent which has passed through the filter in a perforated discharge riser positioned diametrically opposite said distribution line outlet to maximize the detention time of said effluent in the filter, directing the collected effluent to a final treatment phase, continuously venting gaseous products produced in said anaerobic filter through overflow weirs positioned on said effluent discharge line and said discharge riser into a vent system, bypassing said anaerobic filter by directing said effluent from said septic tank through said overflow weirs into said discharge riser when the filter becomes clogged, and washing the filter to restore the flow of said effluent through the filter.

9. A method for treatment of sewage as claimed in claim 8 comprising, when the water table and soil condition permits, directing some of the effluent from the laterally surrounding upflow anaerobic filter to the subsoil interfacing with the filter.

10. A method for treatment of sewage as claimed in 9 comprising the periodic restoration of the anaerobic filter by the use of organic or inorganic chemicals.

* * * * *